April 27, 1954     W. I. WOOD     2,676,631
EGG CELL PUNCTURING DEVICE
Filed Dec. 21, 1950
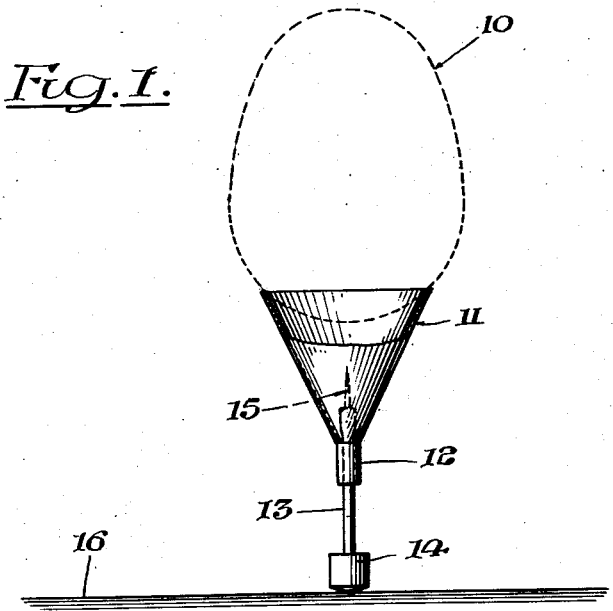
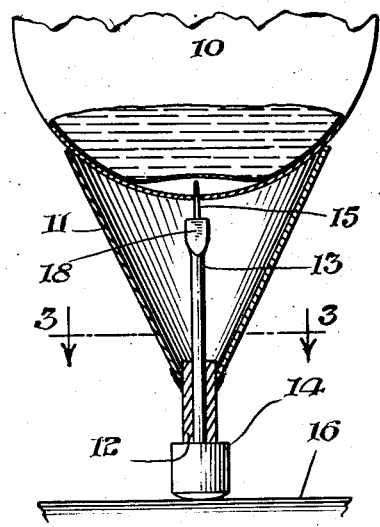
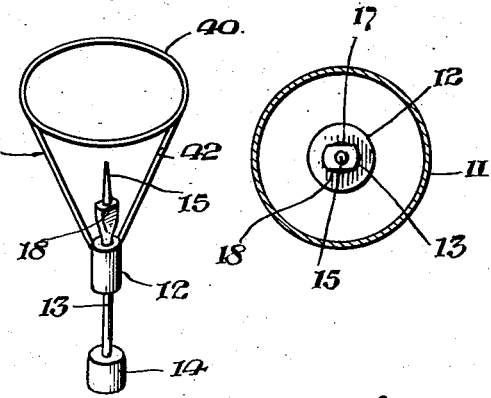
Inventor:
Walter I. Wood
by his Attorneys,
Darby & Darby Patented Apr. 27, 1954

2,676,631

UNITED STATES PATENT OFFICE 2,676,631

EGG CELL PUNCTURING DEVICE

Walter I. Wood, Sea Cliff, N. Y.

Application December 21, 1950, Serial No. 202,065

2 Claims. (Cl. 146—2)

This invention relates to the science of egg handling and also to culinary science as practiced in the cooking of the eggs.

Large producers of eggs frequently sort eggs for their quality to market certain ones and retain others for hatching purposes. Ofter fertilized eggs which are to be marketed are in a sense "denatured" and rendered unfit for hatching by pricking them. The exact action by which the small hole thus formed in the eggs interferes with the hatching is not clear, but in any event the practice is carried out.

A somewhat unrelated phase of egg handling which develops in the practice of culinary science comes about in the cooking of eggs. The air cell in the eggs, which is enclosed in the membrane lining at or near the large end causes considerable difficulty in that upon expansion when it strikes the hot water, it will frequently crack the shell, much to the detriment of the appearance and the handling qualities of the cooked product. It has been observed that puncture of an egg at or near the air cell will permit the escape of the expanding air and avoid the difficulty in the kitchen. The principal reason that the practice of pricking eggs prior to cooking is not considerably more common, despite its many advantages, is that no convenient apparatus is available for performing the operation. It is accordingly a fundamental object of the instant invention to provide a convenient apparatus which can be stored in a small kitchen compartment for the purpose of pricking eggs.

It is another object of the invention to provide a convenient hand apparatus for egg handlers to prick the shells.

It is another object of the invention to provide a device useful either in the home or in large scale egg handling operations for pricking eggs.

Other objects and advantages of the invention will in part be obvious and in part appear hereinafter.

The invention, accordingly, is embodied in a device comprising a support, a guide mounted on the said support, a needle carrying element running in said guide, a limiter for keeping the length of travel of the needle to a specific amount, the support being sized and related to the guide so that the arcuate end of an egg when placed against the support will be brought within reach of the point of the needle.

In the drawings, Figure 1 is an illustration of the apparatus partially in section, showing an egg supported thereon to indicate the relationship of the support to the needle guide.

Figure 2 is an illustration of the apparatus in section wherein the needle has been advanced at least to the extent of piercing an egg shell.

Figure 3 is a section taken along the line 3—3 of Figure 2, being somewhat enlarged to permit an improved showing of details.

Figure 4 is a perspective sketch of an alternative embodiment of the device.

Referring back to Figure 1, 10 represents an egg, 11 a supporting element, 12 the guiding sleeve, 13 the needle support shaft running in said sleeve, 14 a knob on the shaft, 15 the needle point itself.

As seen in the figure, the device consists of the combination of a support, sleeve and shaft carrying a needle. In use the large end of the egg is placed over the support end, being held thus, the knob 14 is tapped gently on a table top or surface 16, thereby bringing the needle sharply to the shell and piercing the egg.

This is better shown in Figure 2 where a detailed section has been made and the needle is shown having punctured the egg and air cell. If the needle pierces the membrane and reaches the egg white itself, no harm is done for coagulation of the white will keep any appreciable amount from escaping.

In Figure 3 the several parts of the device will be identified and it can be seen that the shaft 13 holds the needle 15 by having the needle inserted therein and being crimped to form flat sides 17 and 18 thereby to seize the needle firmly.

In Figure 4 an alternative embodiment of the device, essentially a wire form, is shown as consisting of a circular support 40, having two or more inclined supports 41 and 42 connected to the sleeve 12 which holds a shaft, needle and knob in essentially the same manner as shown in Figure 1.

In forming the apparatus and support 11 or 40, 41 may be made of a light gauge sheet metal rolled to form a cone, or of wire twisted to define the required geometric figure. The utility of the device is achieved by supplying a support for the large end of the egg in combination with the accurately placed needle so that the puncture can be made. Another embodiment of the device involves an injection molded body and support, like that shown in Figure 1 or 4, wherein the support may be formed of any of the conventional relatively firm plastic materials commonly used for making articles of this nature.

While the invention has been described specifically in terms of a few embodiments, it is apparent that the device may take a variety of forms without departing from the spirit or scope thereof.

What is claimed is:

1. A device for puncturing the shell of an egg, comprising a circular ring support to contact a circular section of the egg shell on a diameter smaller than the diameter of the section of the egg and large enough to circumscribe the normal air cell in such egg, extensions from said support, a guide held by said extensions and oriented centrally with respect to said circular ring support, a shaft free-running in said guide carrying a small sharp point, and means on said shaft for limiting the distance of movement thereof to an amount sufficient to cause the point to puncture the shell of an egg held on said support.

2. A device in accordance with claim 1, in which the ring support is the open base of a circular cone.

References Cited in the file of this patent

UNITED STATES PATENTS

| Number | Name | Date |
|---|---|---|
| 1,491,908 | Greig | Apr. 29, 1924 |
| 2,224,941 | Weimer | Dec. 17, 1940 |

FOREIGN PATENTS

| Number | Country | Date |
|---|---|---|
| 180,503 | Germany | Jan. 17, 1907 |